L. R. COMPTON.
POWER AND TRANSMISSION MECHANISM.
APPLICATION FILED DEC. 17, 1912.
1,208,751.
Patented Dec. 19, 1916
3 SHEETS—SHEET 1.
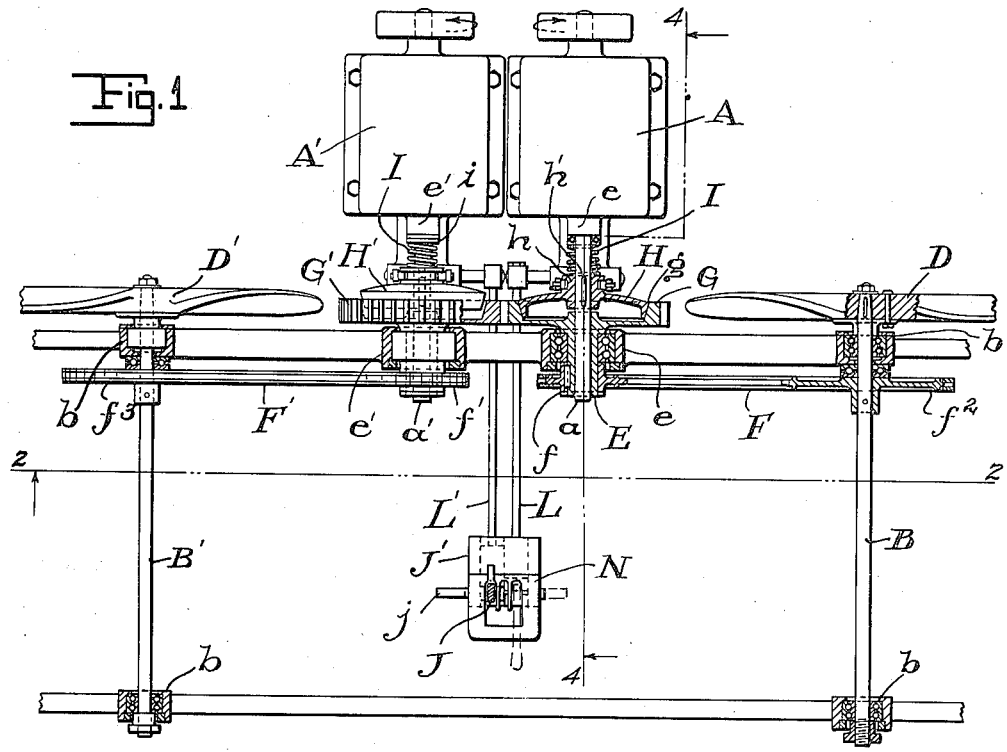
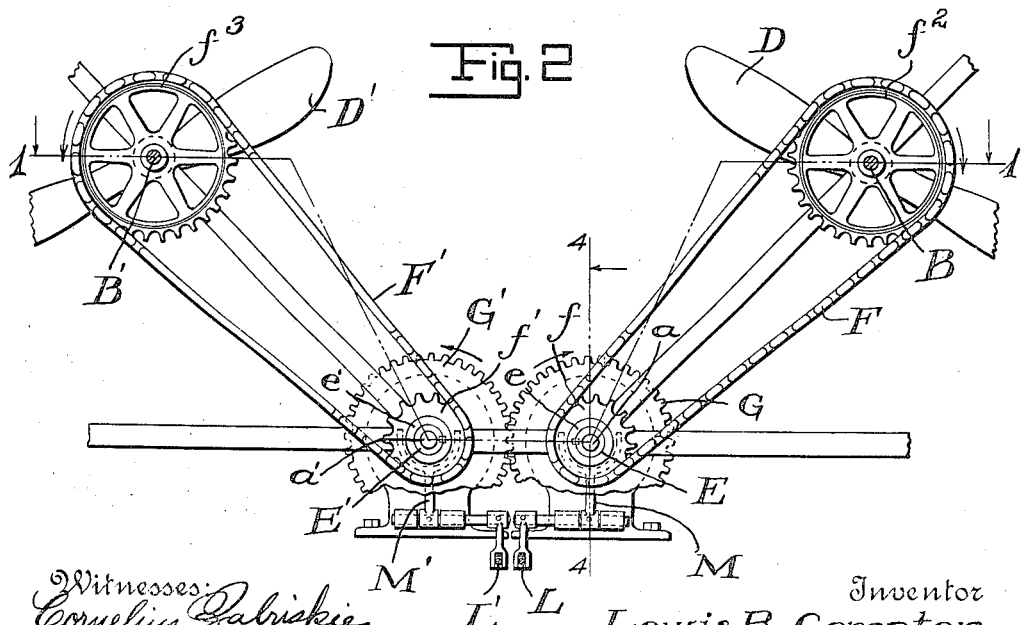

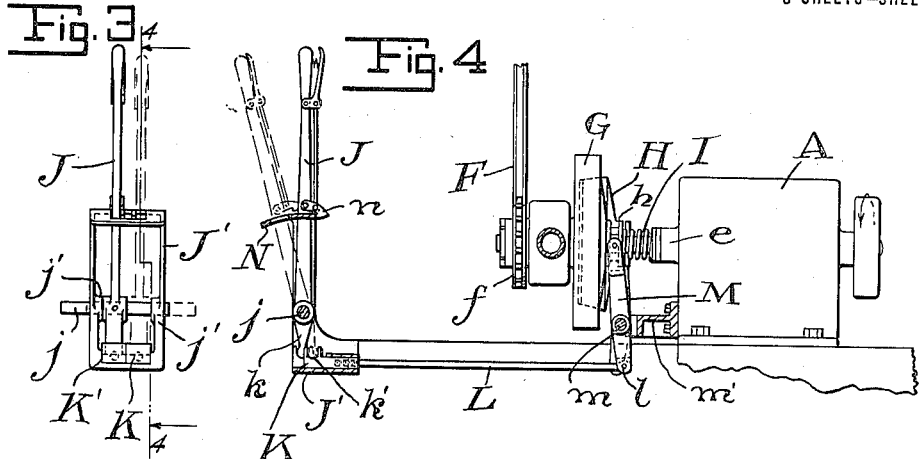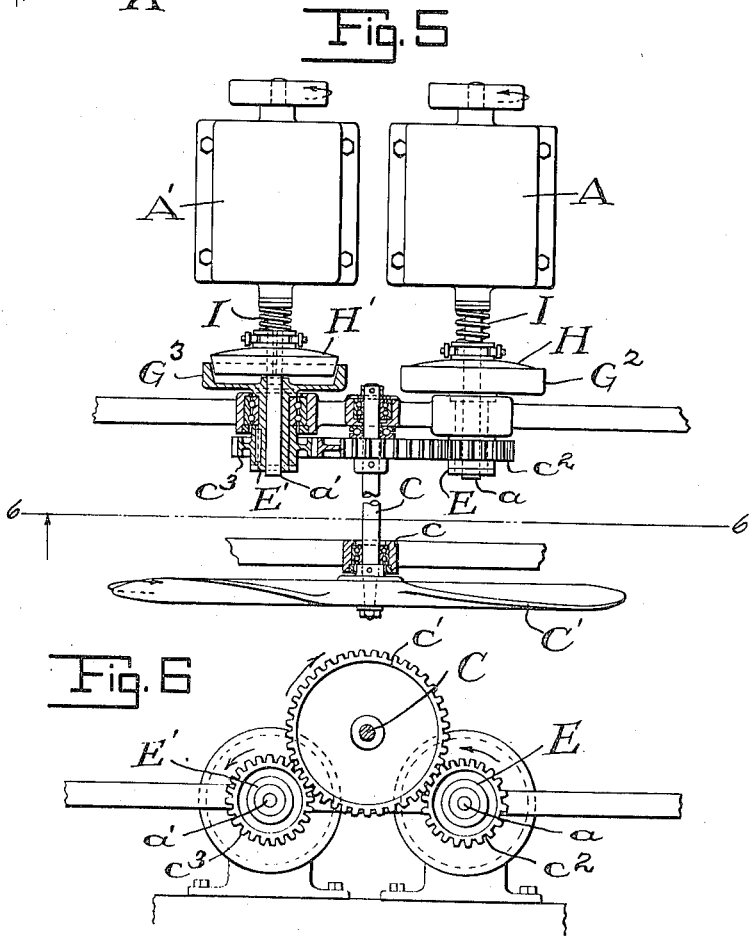

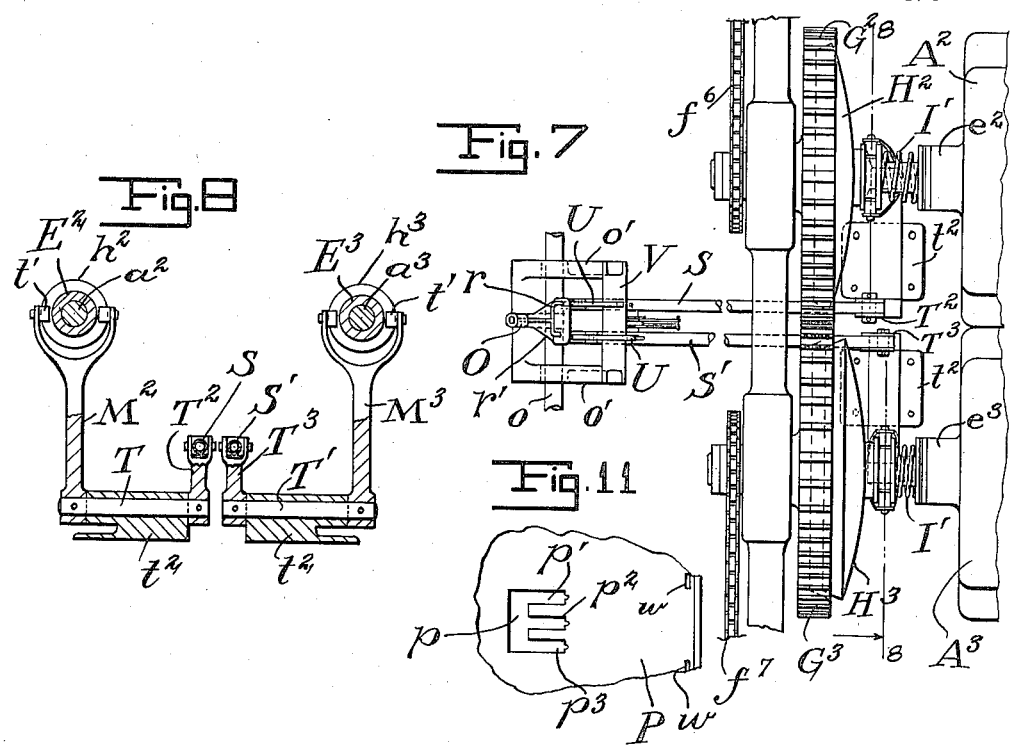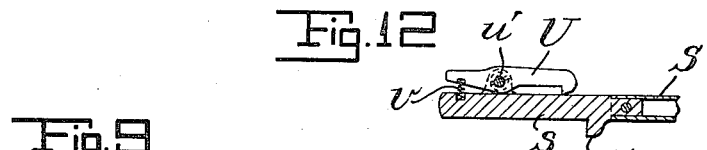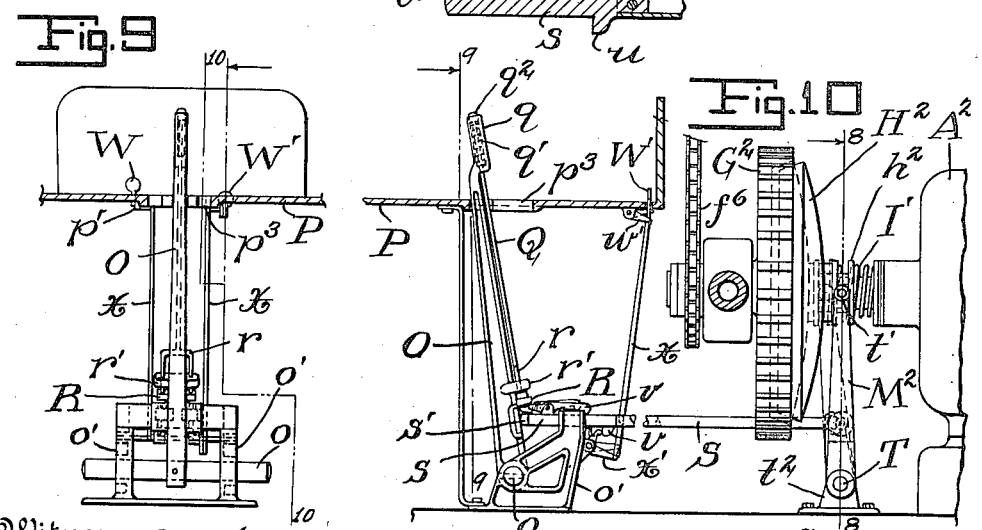

UNITED STATES PATENT OFFICE.

LEWIS R. COMPTON, OF EAST ORANGE, NEW JERSEY.

POWER AND TRANSMISSION MECHANISM.

1,208,751.

Specification of Letters Patent.

Patented Dec. 19, 1916.

Application filed December 17, 1912. Serial No. 737,215.

*To all whom it may concern:*

Be it known that I, LEWIS R. COMPTON, a citizen of the United States, residing at East Orange, county of Essex, and State of New Jersey, have invented a certain new and useful Power and Transmission Mechanism, of which the following is a specification.

This invention is a power and transmission mechanism embodying several features of novelty, among which may be mentioned a plurality of engines or motors either of which is adapted to drive a plurality of driven members; a plurality of engines all of which are adapted to drive a common driven member; mechanism whereby one or more of the said motors may be caused to operate independently of the others when the latter from any cause are out of service and without permitting the idle motor or motors to act as a drag upon the operating one or ones; and controlling mechanism, operating selectively, for controlling the operations of the engines or motors in the manner specified.

Heretofore it has been proposed to employ a plurality of motors or engines conjointly, but so far as I am aware, they have been coupled together in such manner that one could not be employed independently of the others without exerting a drag on the non-operating motors. Moreover, such motors or engines were not so installed that one or more could be cut out, leaving the balance to operate on all the driven members, or upon a common driven member.

The invention is particularly adapted for use on aerocrafts, although it will be apparent that it is capable of use in other relations. When used on aeroplanes, it provides greatly increased lifting power when starting a flight, a feature of vital importance in aerocrafts, and when the craft is in flight, one or more of the motors may be, and preferably are, cut out of service owing to the lesser power required, thus effecting economy in fuel consumed. Furthermore, in the event of one of the motors or engines becoming disabled during flight, the other engine or motors can be relied upon to propel and control the aerocraft, thereby reducing to a minimum the possibilities of accident.

Features of the invention, other than those specified, as well as the functions and advantages thereof, will be apparent from the hereinafter detailed description taken in connection with the accompanying drawings.

In the accompanying drawings, I have illustrated different practical embodiments of the invention, but the constructions shown therein are to be understood as illustrative, only, and not as defining the limits of the invention.

Figure 1 is a plan view partly in horizontal section of the power and transmission mechanism embodying this invention, the plane of the section being indicated by the irregular dotted line 1—1 of Fig. 2. Fig. 2 is a vertical sectional elevation on the plane of the dotted line 2—2 of Fig. 1 looking in the direction of the arrow. Fig. 3 is a detail view of the controlling lever, the dotted lines illustrating one of the positions into which said lever may be shifted. Fig. 4 is a sectional elevation of the controlling mechanism for operating the clutch, the plane of the section being indicated by the dotted line 4—4 of Figs. 1, 2 and 3 looking in the direction of the arrow. Fig. 5 is a plan view illustrating another embodiment of the invention wherein the power of a plurality of engines is applied to operate a single driving member. Fig. 6 is a vertical cross section, partly in elevation, the plane of the section being indicated by the dotted line 6—6 of Fig. 5 looking in the direction of the arrow. Fig. 7 is a plan view illustrating a preferred form of the selective controlling mechanism. Fig. 8 is a cross section in the plane of the dotted line 8—8 of Figs. 7 and 10 looking in the direction of the arrow. Fig. 9 is a transverse section in the plane of the dotted line 9—9 of Fig. 10. Fig. 10 is a section at right angles to Fig. 9, and in the plane of the dotted line 10—10 of Fig. 9. Fig. 11 is a plan of a part of the platform illustrating the slotted construction thereof. Fig. 12 is a detail sectional view of a part of a clutch operating rod employed between the clutch lever and the controlling lever.

A A' designate a plurality of motors or engines the power of which is communicated by a transmission mechanism either to a plurality of driven members B B', as in Figs. 1 and 2, or to a single driven member, as C in Figs. 5 and 6. Manifestly, the motors or engines may be of any type, and the driven members B B' or C may be of any form. For the sake of convenience, however, I will refer to the engines or motors as explosive engines adapted to be driven by the energy of a combustible gas or mixture. The driven members B B' are shown as shafts supported in suitable bearings $b$ of the ball bearing type, each shaft being equipped with a member to be driven such as the propeller D. The single driven member C is shown, also, as a shaft mounted in bearings $c$ similar to bearings $b$, said single driven member having a member to be driven such as the propeller C'. It will be understood, however, that the invention is not restricted, first, to the form of motor or engine, a plurality of which is used, second, to any particular kind of driven member, such as a shaft, or, third, to the combination with either a single driven member or a plurality of driven members.

Proceeding now to a detailed description of that embodiment of the invention wherein a plurality of driven members are employed, as illustrated in Figs. 1 to 4, inclusive, it will be noted that the engines A, A' are positioned in close proximity to each other and so that the engine shafts $a$, $a'$ are parallel to each other, said engine shafts being prolonged or extended for suitable distances beyond the engine cylinders, whereby the shafts $a$, $a'$ are supported in suitable bearings $e$, $e'$.

As shown in Fig. 1, two of the bearings $e$, $e'$ are preferably of the ball bearing type, and these bearings support tubular countershafts E, E', the latter being loosely fitted upon the extended portions of the engine shafts $a$, $a'$. The tubular countershafts are quite short as compared to the length of the engine shafts, each tubular countershaft being provided with one gear of a train of transmission gears and with a member whereby the motion of the countershaft is communicated to a driven member. As shown, tubular countershafts E, E' are provided at their ends with sprocket wheels $f$, $f'$ with which engage sprocket chains F, F' adapted to run over sprocket wheels $f^2$, $f^3$ secured respectively to the driven members B, B', said sprocket gears and chains constituting one embodiment of means for communicating the motion of the tubular countershafts E, E' to the driven members or shafts B, B'.

G, G' designate the gears of a train or pair, said gears being carried by countershafts E, E' by attaching the gears rigidly to said shafts in any suitable or preferred way. The gears are of such diameter that they mesh directly together, see Figs. 1 and 2, and these gears rotate idly with respect to the engine shafts, although they are adapted to drive the countershafts in a manner to impart motion to the sprocket wheels and chains for propelling the driven members B, B' from said countershafts. Each gear G, G' is provided with a clutch face $g$, the clutch member being in the form of a rim or flange with a conical inner surface, as shown in Fig. 1. With said clutch members $g$ of the gears G, G' coöperate clutches H, H', the hubs $h$ of which are connected slidably with the engine shafts $a$, $a'$, by splines or feathers $h'$, whereby said clutches H, H' are connected with the engine shafts to rotate at all times therewith but these clutches are capable of movement on the engine shafts in the direction of the length thereof for the purpose of withdrawing the clutches from engagement with the clutch members on the transmission gears G, G'. Said clutches are moved normally in a direction toward the transmission gears by suitable retractors, herein shown as coiled springs I which loosely encircle the engine shafts and are positioned for engagement with hubs $h$ of the clutches, said springs being seated against shaft bearings $e$, $e'$ or collars $i$ loose on the engine shafts, whereby the springs act to impel the clutches normally into engagement with the clutch members of transmission gears G, G'.

It is apparent that the transmission gears and the clutches are disposed in compact relation to each other, that the clutches are impelled by their springs into positions for engagement normally with the transmission gears, and that the gears mesh directly together. The power of the separate engines is communicated through the separate clutches to the independent gears, that is to say when one clutch is in engagement with its complemental gear the power of that particular engine is transmitted from the shaft through the clutch to the gear, whereby the power of the engine is applied to operate the driven members. Should the clutch, as H', of one engine, as A', be adjusted out of coöperative relation to its complemental gear, as G', and the clutch H of the other engine A be in engagement with its proper gear G, then the first named gear G' is free to rotate idly with respect to the shaft of engine A' and the clutch H', whereas the engine A will drive clutch H and gear G so that gear G' will be rotated from gear G, and thus the two countershafts E, E' will operate the sprocket chains for imparting motion to driven members B, B' simultaneously. It will be noted that the power of engine A which remains in operation is not communicated by gear G' to the inactive engine A', for the reason that clutch H' is free from engagement with gear G'. Obviously, clutch H' may be moved at will into engagement with gear G', and thus both engines A, A' will be coupled up with the driven members B, B' so as to operate said driven members with increased power; and, furthermore, clutch H may be moved out of engagement with gear G so as to render engine A inactive while engine A' remains in service for the purpose of imparting motion through clutch H' to gear G' whereby gears G, G' will be driven by engine A', for the purpose of imparting motion to driven members B, B' simultaneously, under which circumstances engine A is inactive and both driven members are propelled from engine A'.

For operating the clutches I have devised a controlling mechanism intended for manual operation and so related to the clutches that either may be moved into engagement with its proper gear or both clutches may be simultaneously made fast with their respective gears, said controlling mechanism being illustrated more particularly in Figs. 3 and 4. The controlling mechanism embodies a single manually controlled member in the form of a lever J, the same being mounted on a sliding and rotating arbor $j$, supported loosely in bearings $j'$ of a frame J', the latter being secured fixedly in place at any suitable point within convenient reach of an attendant. Said lever is provided with a head $k$, preferably of the ball shape shown in Fig. 4, and this head of the lever coöperates with a notch or notches $k'$ provided in each of two sliding blocks K, K'. Connected to said blocks, K. K' are rods L, L', respectively, the other ends of which are pivotally connected by pins $l$ to shipping levers M, M', said shipping levers being suitably supported on a rod $m$ attached to a bracket $m'$. The upper ends of the shipping levers are forked as shown by dotted lines in Fig. 2, whereby the forked ends of the levers are loosely connected with the hubs $h$ of clutches H'. Suitable means are provided for retaining the controlling lever in its adjusted position. As shown, said lever is provided with a latch $n$ provided to catch over one edge of a locking plate or member N when the controlling member is moved into an adjusted position.

Obviously, the controlling lever may occupy the full line position of Fig. 3 and the head $k$ thereof moved into engagement with the notch $k'$ of sliding block K', thus connecting the controlling lever through rod L' and clutch lever M' with clutch H' for the purpose of moving the latter against the tension of the spring I, thereby disengaging clutch H' from gear G', the lever being locked in position by latch $n$ so as to preclude the spring I from forcing said clutch H' into engagement with gear G'. Under these conditions one engine, as A, imparts motion to both gears G, G' and countershafts E, E' to operate driven members B, B' simultaneously. To adjust the clutch H out of engagement with gear G the operator moves lever J from the full line position of Fig. 3 to the dotted line position of the same figure, thus bringing the head of the lever into engagement with block K and releasing it from engagement with the block K', after which lever J may be moved to the full line position of Fig. 4 so as to turn clutch lever M in a direction to withdraw clutch H from gear G, under which circumstances spring I acts on clutch H' to move it into engagement with gear G' so that engine A is out of service while engine A' operates to drive both gears and both driven members. In addition to separately controlling the clutches, lever J may be moved to a position intermediate the two positions shown in full and dotted lines respectively in Fig. 3, thus bringing the head of the lever into engagement with the notches of two sliding blocks, whereupon said lever may be moved to impart motion to the blocks simultaneously and thus levers M, M' will both be operated to withdraw clutches H, H' from engagement with gears G, G' whereby both engines A, A' will be released from operative engagement with the countershafts and the driven members.

In Figs. 1 to 4, inclusive, the mechanism is illustrated as adapted for use in driving the two propellers of an aerocraft, but it will be distinctly understood that the invention is not limited to this paricular art. As is well known, it is desirable to apply the greatest power to an aerocraft at the beginning of flight, and when the craft is sailing through the air the power required is, or may be, reduced in order to effect economy in the consumption of fuel. The power and transmission mechanism of the present invention provides means for exerting the maximum effect upon the propellers at the beginning of flight, for the reason that both engines may be brought into operation to drive the two propellers D D' from said engines. After the craft is in the air, the controlling lever may be operated so as to throw one engine out of engagement with the propellers, but the other engine will remain in service for the purpose of simultaneously driving the propeller without, however, having to overcome the friction of the engine which is not in service. Should any breakdown of the engine in service occur, then the aviator is enabled by operating the lever J to quickly disengage the disabled engine from the propelling mechanism and to bring the other engine into service, the control of the two engines being effected from a single operating lever.

In Figs. 5 and 6 of the drawings the transmission mechanism is arranged to apply the power of the two engines to a single driven shaft C, the latter having one propeller C'. This shaft is positioned between and parallel to the engine shafts, and in lieu of the sprocket and chain gearing of Figs. 1 and 2, I employ a single spur gear $c'$ on shaft C, said spur gear $c'$ meshing directly with other spur gears $c^2$ $c^3$ provided on the tubular shafts E E'. These tubular shafts carry clutch members G² G³ with which coöperate the clutch members H H' on the engine shafts.

Figs. 7 to 12, both inclusive, illustrate a preferred form of the selective controlling mechanism, the function of which is to secure a true independence of action on the part of the operating rods which control the clutches, whereby either rod may be positively locked in position to retain its corresponding clutch free from engagement with the gear of the transmission. The controlling lever O is mounted for rocking and sliding movement by means of an arbor $o$ supported in short posts $o'$, the upper part of said lever projecting above a platform P, for which purpose said platform is shown in Figs. 9, 10 and 12 as having slots $p$ $p'$ $p^2$ $p^3$, the slot $p$ crossing the other slots and connected therewith. Manifestly, lever O is free to slide sidewise on arbor $o$ when said lever is positioned in the cross slot $p$, but the lever is movable forwardly into one or the other of the slots $p'$ $p^3$ when the clutches are engaged and into slot $p^2$ when the lever is in an intermediate position, both engines being coupled for operation simultaneously to exert their power upon the driven members.

As shown in Figs. 9 and 10, lever O is fulcrumed at its lower extremity by arbor $p$, but the upper end of said lever is furnished with a spring housing or casing $q$ within which is contained a coiled spring $q'$, shown in dotted lines in said Figs. 9 and 10. Through the casing passes the upper end portion of a rod Q, the upper extremity of which terminates in a push piece $q^2$. Said rod Q extends downwardly alongside of lever O, the lower part of said rod having a yoke $r$ the legs of which pass through a guide member $r'$ provided on the lever O. Secured rigidly to the yoke $r$ is a shoe R, the latter being positioned below the guide $r'$. This shoe is movable relative to lever O and guide $r'$, the upward movement of the shoe being effected by the action of spring $q'$ on rod Q, but by pressing downwardly upon the push piece $q^2$ of this rod, shoe R is adapted to be lowered into engagement with fixed members provided at the rear ends of clutch operating rods S S'; said rods extending from controlling lever O to the levers which operate the clutches.

Engines A² A³ and the transmission mechanism associated therewith are of the type heretofore disclosed, that is to say, said engines have parallel shafts $a^2$ $a^3$ on which are splined hubs $h^2$ $h^3$ of clutches H² H³, the latter coöperating with clutch faces on intermeshing transmission gears G² G³, which transmission gears are made fast with tubular countershafts E² E³ fitted respectively on the engine shafts $a^2$ $a^3$ so as to turn freely thereon. The hubs of the two clutches are provided with annular grooves in which are loosely fitted rollers $t'$ on the upper forked ends of levers M² M³, the latter being fulcrumed at their lower ends. As shown, said levers are attached rigidly to short horizontal rock shafts T T' which are supported in bearings of suitable brackets T², the latter being in alinement with each other, as shown in Fig. 8. Clutch levers M² M³ are attached to the outer ends of these rock shafts and on the inner adjacent ends of these rock shafts are provided short upstanding arms T² T³, to the upper ends of which are pivotally connected the forward end portions of rods S S', respectively. The clutches H² H³ are impelled normally toward the gears G² G³ of the transmission by springs I' which are coiled loosely around the engine shafts and are seated against the shaft bearings $e^2$ $e^3$. The countershafts E² E³ are supported in suitable bearings of the framework, and these countershafts are provided in addition to gears G² G³ with sprocket wheels which are engaged by the sprocket chains $f^6$ $f^7$, the latter being adapted for transmitting the motion to driven members, such as B B', in Fig. 1.

Each clutch operating rod S or S' is shown in the form of a metal tube, the latter being provided at one end with a solid metal extension piece $s$. The extension piece is shown in Fig. 10 as having a lug $s'$ with which is adapted to engage the shoe R when lever O and rod Q are operated. In addition to lug $s'$ at the rear of each rod the extension piece $s$ is provided with a shoulder $u$ positioned forwardly of lug $s$, said shoulder depending from the extension piece. On the extension piece $s$ is mounted a dog U, the same being shown in the form of a pawl pivotally supported on the extension piece $s$ by a pin $u'$. This pawl is normally acted upon by a spring $v$ which depresses the ends of the pawl into locking engagement with a bridge piece V, the latter being attached to the forward extending portions of the posts $o'$ in which is mounted the arbor $o$ serving as the fulcrum for controlling lever O. The rods S S' are fitted slidably in bridge piece V so as to be supported and guided thereby and the pawls U on said rods S S' are adapted for locking engagement with the front edge of the bridge bar. It will be observed that the lever O is not directly connected with the clutch operating rods S S', and that each of said rods is provided with a pivoted spring actuated pawl adapted for locking engagement with bridge bar V.

In Fig. 7 clutch H² is pressed by spring I' into engagement with gear G², whereas clutch H³ is held out of engagement with gear G³ by rod S' and the pawl U on said rod S' engaging with the bridge bar V, the spring I' being compressed, whereby engine $A^2$ operates to drive gear $G^2$, and the latter gear imparts motion to the companion gear $G^3$, as a result of which the two gears $G^2$ $G^3$ and the sprocket chains $f^6$ $f^7$ operate to impart motion to the driven members, such as B B'. Under these conditions engine $A^3$ is out of service and engine $A^2$ operates through the transmission mechanism to drive both driven members. Should it be desired to bring engine $A^3$ into service, to the exclusion of engine $A^2$ for any reason, the controlling lever O and the rod Q are operated to release dog U on rod S' from engagement with bridge bar V, whereupon spring I' acts to impel clutch $H^3$ into engagement with gear $G^3$, and in order to throw engine $A^2$ out of service the controlling lever O and rod Q are manipulated to move rod S in a direction to bring its pawl U into fixed relation with bridge bar V and at the same time to operate arm $T^2$, shaft T and lever $M^2$ in a direction to withdraw clutch $H^2$ from gear $G^2$ placing spring I' of engine $A^2$ under compression. The clutch $H^2$ is thus disengaged and clutch $H^3$ engaged so that the engine $A^3$ will operate through clutch $H^3$ to impart motion to gears $G^3$ $G^2$ and the transmission mechanism to the driven members. Under these conditions rod S is locked by its pawl U to hold clutch $H^2$ in an idle position, the controlling lever O being thrown forwardly into slot $p^3$. When the controlling lever O is moved to a neutral position and occupies slot $p^2$, the shoe R is midway between the lugs $s'$ on rods S S' and between the two dogs U on said rods S S'. At this time the lever O does not operate to impart movement to either of the rods S S', and, accordingly, the clutches $H^2$ $H^3$ are pressed by their springs into engagement with gears $G^2$ $G^3$ so that both engines are effective in driving the transmission mechanism for imparting movement to the driven members.

The selective controlling mechanism herein described operates tell-tale devices by which the aviator or operator is enabled to determine the engine or engines in service. Platform P is provided at its forward portion with slots $w$ through which extend pivoted tablets W W' each actuated by a crank arm $w'$ to which is connected a rod $x$. The rods $x$ depend from the platform and are pivoted at their lower ends to bellcranks $x'$, one end of each bellcrank being normally in the path of the depending lug $u$ on the extension piece $s$ of rods S S'. When one rod, as S, is pressed rearwardly by spring I' to throw clutch $H^2$ into engagement with gear $G^3$, the shoulder $u$ of said rod S engages with bellcrank $x'$ so as to throw tell-tale W into an exposed position, see Fig. 9, thus indicating that engine $A^2$ is in operation. In a similar manner tell-tale W' is brought into an exposed position when rod S' is pressed rearwardly by the spring which throws clutch $H^3$ into engagement with gear $G^3$ to denote that engine $A^3$ is in service, and should both engines be brought into use then the two tell-tales W W' will be brought into exposed positions by the lugs on rods S S'.

Having thus fully described the invention, what I claim as new, and desire to secure by Letters Patent is:

1. The combination of a plurality of engines, a plurality of parallel driven shafts, transmission mechanism coöperating with the engines and the driven shafts, a single lever, and controlling means operable by said single lever whereby one or all of said engines may be used for driving said shafts.

2. The combination of a plurality of engine shafts, a plurality of parallel driven members, a train of gears certain of which are mounted directly on said engine shafts, said train of gears operating to transmit the power of one or all of said engine shafts simultaneously to said independent driven members, and means for rendering inactive one or all of said gears whereby either of said engines may be employed to impart motion to the driven members without affecting the inactive engine or engines.

3. The combination of a plurality of engines, a plurality of countershafts, driven mechanism, means connecting said countershafts with the driven mechanism, intermeshing gears loosely mounted on the shafts of said engines, separate clutch mechanisms whereby said gears may be applied to operate the countershafts from said engine shafts, and means for operating the clutch mechanisms.

4. The combination of a plurality of engines, driven mechanism, a plurality of countershafts operatively connected with said driven mechanism, gears mounted loosely on the shafts of said engines and meshing with each other, and means controllable at will for making said loose gears fast with the shafts of the engines, whereby both engines may impart motion to the driven mechanism or either engine may be thrown out of service in such manner that the inactive engine will not be affected by the engine remaining in service.

5. The combination of a plurality of engines, driven mechanism, a plurality of countershafts operatively connected with the driven mechanism, gears fast with said countershafts and meshing with each other, said gears being rotatable independently of the shafts of said engines, a plurality of clutch mechanisms each coöperating with one engine shaft and one of said gears, and means for operating said clutch mechanisms at will whereby the engines may be conjointly applied to operate the driven mechanism and one of said engines may be thrown out of service in a manner that it will remain unaffected by the operation of the active engine.

6. The combination of a plurality of engine shafts, driven mechanism, a plurality of tubular countershafts fitted loosely to said engine shafts, said countershafts being connected operatively with said driven mechanism, intermeshing gears fast with said countershafts, said gears having clutch-surfaces, clutches slidable on the engine shafts and positioned in operative relation to the clutch surfaces of said gears, and controlling mechanism operating selectively for applying through said gears and clutches the power of said engines collectively or individually to said driven mechanism.

7. The combination of a plurality of driving shafts, transmission mechanism normally free from said driving shafts, separate clutch mechanisms whereby either of said driving shafts may impart motion to said transmission mechanism, a plurality of clutch operating rods, means for locking the rods individually, and a single controlling lever whereby the rods and their locking means may be operated to bring either of said clutch mechanisms into operative relation to the transmission mechanism and the driving shafts.

8. The combination of a plurality of driving shafts, intermeshing gears normally free with respect to said shafts, separate clutches coöperating with the shafts and said gears, operating rods individually connected with said clutches, means for retaining each rod in a position to retain one clutch free from engagement with the companion gear, and a controlling lever shiftable into positions for operating said rods individually.

In testimony whereof I have signed my name to this specification in the presence of two subscribing witnesses.

LEWIS R. COMPTON.

Witnesses:
H. I. BERNHARD,
M. C. RODRIGUEZ.